Aug. 26, 1924.

H. A. WYNNE

TRANSMISSION APPLIANCE

Filed Oct. 18, 1920

1,506,400

Inventor
Howe A. Wynne,
by Rippey & Kingsland,
Attorneys.

Patented Aug. 26, 1924.

1,506,400

UNITED STATES PATENT OFFICE.

HOWE A. WYNNE, OF HARTVILLE, MISSOURI.

TRANSMISSION APPLIANCE.

Application filed October 18, 1920. Serial No. 417,575.

*To all whom it may concern:*

Be it known that I, HOWE A. WYNNE, residing at Hartville, Wright County, Missouri, a citizen of the United States, have invented a new and useful Transmission Appliance, of which the following is a specification.

This invention relates to a transmission appliance for utilizing the power of an automotive engine to operate any mechanism while the vehicle is stationary.

An object of the invention is to provide a transmission appliance capable of utilizing the power of the engine of a tractor, or the power of any other automotive engine with which the appliance may be combined, to operate any desired mechanism while the tractor or other vehicle containing the engine is stationary.

Another object of the invention is to provide an improved transmission appliance which may be conveniently embodied in tractors of such well known types as the Fordson tractor to utilize the power of the engine in a safe and convenient manner while the tractor is stationary.

Another object of the invention is to provide an improved transmission appliance of the type and for the purposes mentioned of novel construction and mode of operation, and containing the belt pulley or other device for utilizing the power thereof, and improved means for controlling the operation of such a pulley or other device so that when the tractor is moving the pulley or device may be maintained in an idle condition. This prevents accidents which might, and in the ordinary course of use of the tractor would result should the pulley or other transmission device be permitted to operate while the tractor is running. It is a well known fact that numerous accidents have resulted in the use of tractors containing transmission devices without any means of preventing operation of the belt pulley, while the tractor is running. The need of a device by which the operation of the belt pulley might be prevented when the tractor is in motion is well known and the present invention completely meets and satisfies that existing recognized need and prevents accidents.

In order to insure against such accidents it has heretofore been necessary to remove the transmission appliance from the tractor when it is desired to use the tractor as such.

In order to permit removal of the transmission appliance it is necessary first to remove the tractor wheel adjacent thereto. This involves a great deal of labor and time, since it is necessary first to make sure that the tractor is properly blocked, and then to raise the tractor by use of a jack or otherwise, and then to remove the tractor wheel, and then to detach and remove the transmission appliance and replace the foot bracket. Due to the considerable amount of time and labor required to perform these operations tractors have often been placed in use as such without removing the transmission appliances. When so used the belt pulley in the transmission appliances heretofore employed revolves during the operation of the tractor and, since the pulley is so close to one of the feet of the operator, accidents have occurred.

My improved transmission appliance overcomes all of the foregoing difficulties and objections. When once installed upon the tractor it is unnecessary to remove the appliance since the belt pulley (or other device used for such purpose) may be controlled to permit the operation thereof when the tractor is in motion, or at any time. The construction and arrangement is such that the belt pulley may be held stationary and will serve in the place of a foot bracket when the tractor is travelling. Thus my invention is made to accomplish highly improved results, to save a great deal of time and labor, to prevent likelihood of accidents, and to dispense with the necessity of putting on a foot bracket when the tractor is to be used as such.

With the foregoing and other objects in view, I have embodied my invention in a practical form which accomplishes all of the advantages stated, as well as others hereinafter made apparent, and have illustrated a satisfactory form of the invention in the accompanying drawings, in which—

Figure 1:
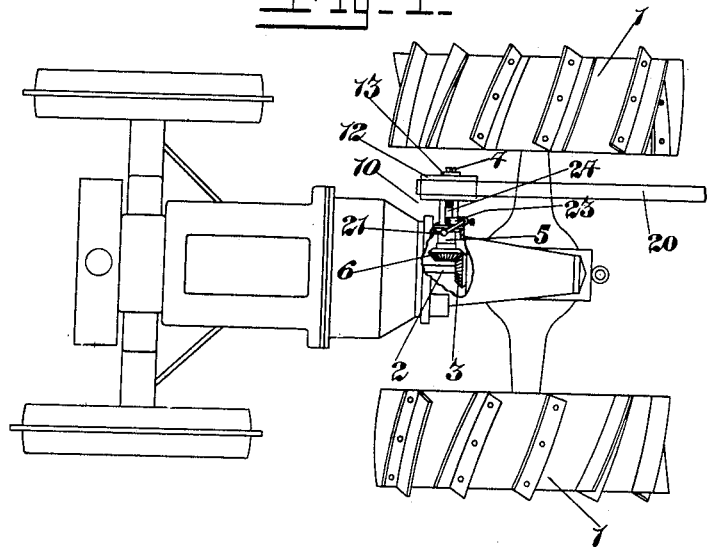
Fig. 1 is a plan view showing my improved transmission appliance embodied in a tractor of the Fordson type.
Figure 2:
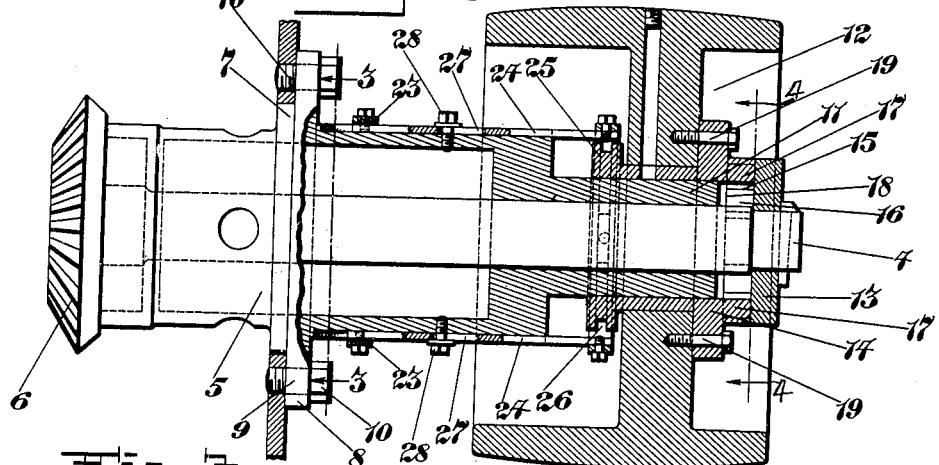
Fig. 2 is an enlarged view, partly in section, showing the transmission appliance detached from the tractor.

The clutch mechanism and the gear shifting mechanism are well known and are not shown in the drawing. It is a familiar fact that the gear mechanism may be controlled so as to drive the tractor wheels 1 or to permit the engine to run without driving the tractor wheels, as desired. By proper manipulation of the clutch and the gear shifting mechanism the transmission drive shaft 2 may be operated without turning the tractor wheels 1, and while the tractor remains in a stationary position, as is well known. My improved transmission appliance is driven from the transmission drive shaft which, for this purpose, is equipped with a beveled gear 3.

As shown, my improved transmission appliance comprises a shaft 4 which is journaled for rotation in a bearing sleeve 5, and which is provided with a beveled gear 6 meshing with the gear 3 on the transmission drive shaft. The bearing sleeve 5 is formed with a flange 7 which fits in the hole in the transmission case to assist in supporting the transmission appliance. A wider flange 8 is also formed on the sleeve bearing 5 and fits against the outer surface of the transmission case and is formed with a number of holes 9 arranged to register with the screw bolt holes in the transmission case. The screw bolts 10 passing through the holes 9 and engaging the holes in the transmission case securely hold the transmission device in position.

It is from the shaft 4 that the transmission pulley or wheel is driven. The novel construction and arrangement of the pulley or device driven from the shaft 4, and the mechanism for controlling the operation of the same, are important features of the present invention. They are important features of the present invention because it is through and by them that the inherent difficulties and defects of prior expedients hereinbefore mentioned have been wholly eliminated and overcome. It is by the novel and efficient control of the belt pulley or device driven from the shaft 4 that all danger in the use of my invention, which danger is always present in the use of the prior devices hereinbefore mentioned, is eliminated.

In the embodiment shown the sleeve 5 is provided with a portion 11 of reduced diameter. A power transmission device, which may be in the form of a pulley 12 as shown, is supported on the end portion 11 of the sleeve. The pulley 12 is supported for rotation on and relative to the sleeve, the fact being that the sleeve itself does not rotate. The pulley is driven from the shaft 4 by means of a novel and efficient device provided for that purpose. As shown the end of the shaft 4 supports a clutch member 13. The clutch member 13 is rigid with the shaft 4 and always rotates with said shaft when said shaft is turning. The pulley is provided with a cooperating clutch member 14, the same being in rigid connection with one side of the pulley web, it being immaterial on which side of the pulley the clutch members are located. The form of the clutch is important. As shown, the clutch member 13 includes a number of recesses 15, the side walls of which converge inwardly making the inner portions of the recesses somewhat narrower than the outer portions and thus providing intervening teeth or projections 16 between the recesses 15, whose side walls converge inwardly (that is toward the shaft 4) thereby making the inner portions of the projections 16 narrower than the outer portions thereof. This construction provides recesses and intervening dentals or teeth whose side walls are perfectly flat. The clutch member 14 is similarly constructed and arranged so that when the pulley 12 is moved in one direction the recesses 15 therein will receive the teeth or projections 17 on the clutch member 14, and the projections 16 on the clutch member 13 will be received in appropriate recesses 18 in the clutch member 14. Preferably the clutch member 14 is detachable from the pulley, the same being held in connection with the pulley by screw bolts 19, which securely hold said parts together. It is immaterial, however, in what way the clutch member 14 be made rigid with the pulley, it only being necessary that said parts be in rigid connection or union with each other.

When the pulley 12 is in clutched engagement with the clutch member 13 said pulley will be rotated whenever the shaft 4 rotates. Thus, any machine or mechanism capable of such operation may be driven from the engine of the tractor. Power may be transmitted from the pulley 12 through the medium of a belt 20 or other appropriate driving device.

As before stated, it is an important feature of my invention that provision be made for maintaining the belt pulley 12 in idle condition when desired. In the form of my invention shown means is provided for this purpose, the same comprising connections for shifting the pulley 12 out of engagement with the clutch 13, so that said pulley may remain idle and stationary even though the shaft 4 be in rotation.

In the embodiment shown the means for shifting the belt pulley 12 comprises a crank device 21 supported for turning movements within a part 22 on the sleeve 5. The crank 21 has a pair of arms or levers 23 rigid therewith, the ends of said arms terminating at diametrically opposite sides of the sleeve 5 and being connected by links 24 with a circumferentially grooved hub 25 in connection with the pulley 12. Such connection between the ends of the links 24 and the grooved pulley 25 may take the form of a ring 26 encircling the hub 25 and engaging within the groove in said hub. Obviously, therefore, it is only necessary to apply a sufficient force or power to the links 24 in order to shift the pulley to any position desired, and this may be accomplished by means of the crank 21.

Figure 3:
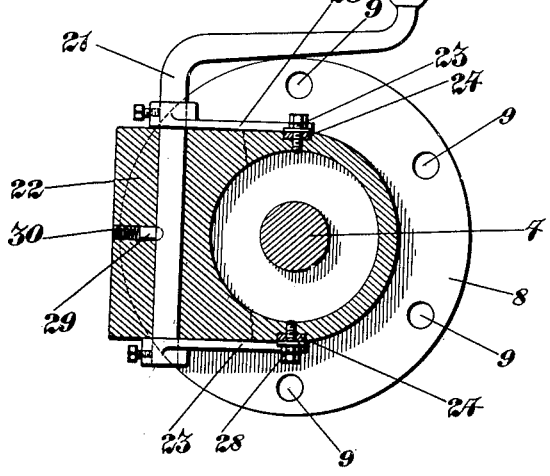
Fig. 3 is a cross sectional view on the line 3—3 of Fig. 2.
Figure 4:
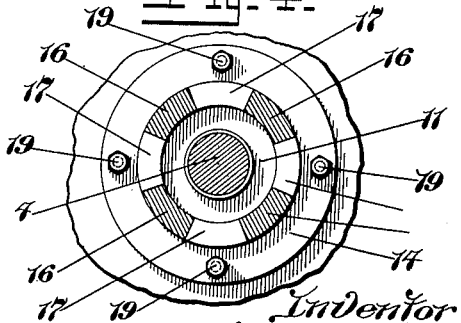
Fig. 4 is a sectional view on the line 4—4 of Fig. 2.

To strengthen the organization and to prevent any accidental displacement of the links 24 and to guide them properly in their movements, said links may be provided with slots 27 to receive the guide pins or members 28 extending through said slots and into the sleeve 5. Thus, by turning the crank 21 in one direction the pulley 12 may be moved into engagement with the clutch member 13; and by turning the crank 21 in the opposite direction the pulley 12 may be moved to position out of engagement with the clutch member 13, leaving the shaft 4 free to rotate without disturbing the pulley. The crank 21 may be latched in either of its two adjusted positions. For this purpose a spring actuated latch member 29 (Fig. 3) is provided, the same being pressed inwardly toward the crank by the spring 30 and arranged to engage in appropriate recesses in the crank 21. However, the crank 21 may be forcibly turned from one position to another, the spring 30 yielding to permit the necessary retraction of the part 29.

My improved transmission appliance may remain permanently upon the tractor.

The provision of the means for controlling the belt pulley so as to prevent operation thereof when the tractor is in motion removes the necessity of going through the tedious and arduous task of taking the appliance off the tractor when it is desired to use the tractor as such, and replacing the appliance when it is desired to make use thereof. This and other novel and advantageous results hereinbefore mentioned or made apparent by reference to the foregoing description and the annexed drawing render my invention highly valuable for its purposes.

It will be seen that the invention serves all of the purposes for which it is designed. It saves a great deal of time and labor and removes the danger heretofore encountered in the use of transmission appliances on tractors. In actual use it has been found of great advantage, because the use thereof has demonstrated that the invention completely fills the existing need and meets all of the requirements hereinbefore stated.

I do not restrict myself to unessential features in the appliance, but contemplate such variations as may be necessary or found advisable, and as may be within the scope of the appended claims.

What I claim and desire to secure by Letters Patent, is:—

1. In a tractor, the combination with the transmission case, and the transmission drive shaft of the tractor within the transmission case, of a second shaft supported by the tractor driven from said transmission shaft and extending outwardly through the transmission case, a clutch member attached to the outer end of said second shaft, a transmission pulley supported independently of said second shaft between said clutch member and the transmission case, a clutch member in connection with said transmission pulley, means supported between said transmission pulley and the transmission case for moving one of said clutch members into and out of engagement with the other whereby said pulley may be operated or left in an inoperative condition when said second shaft is rotating as desired, and means for preventing accidental engagement of said clutch member.

2. In a tractor, the combination with the transmission case, and the transmission drive shaft of the tractor within the transmission case, of a removable support in connection with the transmission case, a shaft journaled for rotation in said support and extending outwardly beyond the support, gearing for driving said second shaft from the transmission shaft of the tractor, a pulley mounted for rotation on said support, clutch members whereby said pulley may be driven from said second shaft, mechanism carried by said support between said pulley and the transmission case for engaging and disengaging said clutch members, and means for preventing accidental engagement of said clutch members.

3. In a tractor, the combination with the the transmission drive shaft thereof, of a sleeve, a shaft journaled for rotation in said sleeve, gearing for driving said second shaft from the transmission drive shaft of the tractor, a clutch member supported on said second shaft, a belt pulley journaled for rotation on said sleeve, a clutch member in connection with said pulley, and mechanism for moving said pulley axially on said sleeve to engage the clutch member in connection with said pulley with the clutch member on said shaft, or to disengage said clutch members as desired.

4. In a tractor, the combination with the transmission drive shaft thereof, of a sleeve, a shaft journaled for rotation in said sleeve, gearing for driving said second shaft from the transmission drive shaft of the tractor, a clutch member supported on said second shaft, a belt pulley journaled for rotation on said sleeve, a clutch member in connection with said pulley, mechanism for moving said pulley axially on said sleeve to engage the clutch member in connection with said pulley with the clutch member on said shaft, or to disengage said clutch members as desired, and means for preventing accidental movement of said pulley to engage or disengage said clutch members.

5. In a tractor, the combination with the transmission drive shaft thereof, of a sleeve, a shaft journaled for rotation in said sleeve, means for driving said second shaft from the transmission drive shaft of the tractor, a belt pulley supported for axial and rotary movements on said sleeve, a clutch device for rotating said belt pulley from said second shaft when said belt pulley is in one of the positions to which it may be moved axially on said sleeve, and mechanism supported by said sleeve for moving said pulley axially on said sleeve to engage or to release said clutch device.

6. In a tractor, the combination with the transmission drive shaft thereof, of a sleeve, a shaft journaled for rotation in said sleeve, means for driving said second shaft from the transmission drive shaft of the tractor, a belt pulley supported for axial and rotary movements on said sleeve, a clutch device for rotating said belt pulley from said second shaft when said belt pulley is in one of the positions to which it may be moved axially on said sleeve, a crank supported by said sleeve, and connections from said crank for moving said belt pulley axially on said sleeve as required to engage or to release said clutch device.

7. In a tractor, the combination with the transmission drive shaft thereof, of a sleeve, a shaft journaled for rotation in said sleeve, means for driving said second shaft from the transmission drive shaft of the tractor, a belt pulley supported for axial and rotary movements on said sleeve, a clutch device for rotating said belt pulley from said second shaft when said belt pulley is in one of the positions to which it may be moved axially on said sleeve, a crank supported by said sleeve, connections from said crank for moving said belt pulley axially on said sleeve as required to engage or to release said clutch device, and means for preventing accidental operation of said crank.

8. In a tractor, the combination with the transmission drive shaft thereof, of a sleeve, means for supporting said sleeve rigidly in connection with the transmission case of the tractor, a shaft journaled for rotation in said sleeve, gearing for driving said second shaft from the transmission shaft of the tractor, a belt pulley supported for rotary and axial movements on said sleeve, a clutch device for driving said pulley from said second shaft when said pulley is in one of the positions to which it is axially movable on said sleeve, and leaving said pulley inoperative when said pulley is in the other position to which it is axially movable on said sleeve, and an actuator for shifting said pulley axially on said sleeve.

9. In a tractor, the combination with the transmission drive shaft thereof, of a sleeve, means for supporting said sleeve rigidly in connection with the transmission case of the tractor, a shaft journaled for rotation in said sleeve, gearing for driving said second shaft from the transmission shaft of the tractor, a belt pulley supported for rotary and axial movements in said sleeve, a clutch device for driving said pulley from said second shaft when said pulley is in one of the positions to which it is axially movable on said sleeve, and leaving said pulley inoperative when said pulley is in the other position to which it is axially movable on said sleeve, an actuator for shifting said pulley axially on said sleeve, and means for preventing said pulley from accidental axial movement on said sleeve.

10. In a tractor, the combination with the transmission drive shaft and the transmission case thereof, of a sleeve, means for supporting the sleeve in rigid connection with the transmission case of the tractor, a shaft journaled for rotation in said sleeve, means for rotating said second shaft from the transmission drive shaft of the tractor, a belt pulley supported for rotary movements on said sleeve and for axial movements to and from position to be rotated, and a releasable clutch device whereby said belt pulley may be optionally rotated from said second shaft.

11. In a tractor, the combination with the transmission drive shaft and the transmission case thereof, of a sleeve, means for supporting the sleeve in rigid connection with the transmission case of the tractor, a shaft journaled for rotation in said sleeve, means for rotating said second shaft from the transmission drive shaft of the tractor, a belt pulley supported for axial and rotary movements on said sleeve, a releasable clutch device whereby said belt pulley may be optionally rotated from said second shaft, and means for moving said belt pulley axially on said sleeve to engage or to release said clutch device as desired.

HOWE A. WYNNE.